United States Patent
Adams et al.

(10) Patent No.: US 7,069,574 B1
(45) Date of Patent: Jun. 27, 2006

(54) SYSTEM TIME CLOCK CAPTURE FOR COMPUTER SATELLITE RECEIVER

(75) Inventors: Thomas G Adams, Longmont, CO (US); Randy R Fuller, Longmont, CO (US)

(73) Assignee: Broadlogic Network Technologies, Inc., Milpitas, CA (US)

( * ) Notice: Subject to any disclaimer, the term of this patent is extended or adjusted under 35 U.S.C. 154(b) by 715 days.

(21) Appl. No.: 09/650,329

(22) Filed: Aug. 29, 2000

Related U.S. Application Data

(60) Provisional application No. 60/152,192, filed on Sep. 2, 1999.

(51) Int. Cl.
*H04N 7/20* (2006.01)

(52) U.S. Cl. ........................ 725/68; 725/131; 725/132; 725/151; 725/152; 370/503; 370/509; 370/512

(58) Field of Classification Search ................ 348/500, 348/464, 469, 516, 518, 521; 725/68, 131–132, 725/139–140, 151–152; 370/468, 503, 509, 370/512, 517, 519
See application file for complete search history.

(56) References Cited

U.S. PATENT DOCUMENTS

| | | | | |
|---|---|---|---|---|
| 5,559,999 A * | 9/1996 | Maturi et al. | ................ | 713/400 |
| 5,650,825 A * | 7/1997 | Naimpally et al. | ......... | 348/465 |
| 5,659,615 A | 8/1997 | Dillon | ......................... | 380/21 |
| 5,699,392 A * | 12/1997 | Dokic | ......................... | 375/376 |
| 5,881,245 A | 3/1999 | Thompson | ............. | 395/200.49 |
| 5,959,659 A * | 9/1999 | Dokic | ......................... | 725/152 |
| 5,960,006 A | 9/1999 | Maturi et al. | ................ | 370/509 |
| 6,493,362 B1 * | 12/2002 | Inazumi | ...................... | 370/537 |
| 6,731,658 B1 * | 5/2004 | Inazumi et al. | ............. | 370/537 |
| 2002/0056133 A1 * | 5/2002 | Fung et al. | .................. | 725/118 |

* cited by examiner

*Primary Examiner*—Ngoc Vu
(74) *Attorney, Agent, or Firm*—Townsend and Townsend and Crew LLP

(57) ABSTRACT

A method and system are provided for synchronizing a digital video system that includes a transmitter, a receiver, and a decoder. A transport packet is received from the transmitter. At the start of receiving the transport packet, a system time clock timestamp is captured. A program clock reference timestamp is also obtained from the transport packet and is compared with the system time clock timestamp.

14 Claims, 1 Drawing Sheet

SYSTEM TIME CLOCK CAPTURE FOR COMPUTER SATELLITE RECEIVER

This application claims the priority of U.S. Prov. Pat. Appl. No. 60/152,192, filed Sep. 2, 1999, which is herein incorporated by reference for all purposes.

BACKGROUND OF THE INVENTION

The Digital Video Broadcast (DVB) standards and the Digital Satellite System (DSS) standards are designed for the delivery of digital video and digital audio "programs" to in-home set-top box appliances. More recently, interest has risen in using these standards for high bandwidth data delivery, for example, to personal computers for applications such as Internet access. The data broadcast may include, for example, internet protocol (IP) packets carrying electronic mail, world wide web content, and other data.

In data broadcast systems, various elementary streams of digital video, digital audio, and digital data typically are time-division multiplexed onto a single transport stream which is broadcast by way of a satellite transponder to multiple receivers. The elementary streams of information or data are generally packetized, as is the transport stream.

A receiver, for example, may be coupled to a personal computer. Such a receiver would receive the transport stream comprising the information, demultiplex elementary streams of digital video, digital audio, and/or data from the transport stream, and filter (select) those elementary streams destined for that receiver. The receiver further should be able to deliver the elementary streams to host memory of the personal computer for processing or display.

However, designing a receiver capable of demultiplexing, filtering, and delivering the elementary streams of information poses difficult problems and challenges. For example, critical timing constraints govern the delivery of elementary streams containing digital video and digital audio programs. These critical timing constraints derive, for example, from the specific timing required for proper decoding and presentation of digital video frames on the host computer. Hence, the particular elementary streams must be demultiplexed, filtered, and delivered in real-time in such a way that these critical timing constraints are met. Moreover, accurate synchronization is required in order to meet these critical timing constraints.

SUMMARY OF THE INVENTION

In accordance with embodiments of the present invention, at the start of every transport packet reception, a first latch in the receiver captures a first system time clock (STC) timestamp. The first STC timestamp may be used to keep the receiver and the transmitter synchronized. In particular, if the transport packet contains a program clock reference (PCR) timestamp from the transmitter, then the PCR timestamp is compared with the first STC timestamp. Based on the comparison, control adjustment may be made to the STC frequency in order to maintain synchronization. In a preferred embodiment, this synchronization is accomplished using firmware in a transport controller within the receiver.

Further in accordance with the present invention, the contents of the transport packet are to be utilized by a decoder that is on a separate node of a host system from the receiver's node. The decoder may comprise hardware and/or software and may, for example, be part of an audio-visual or computer-network interface. To overcome the fact that the decoder and receiver are on separate nodes of the bus, a system and method is provided for the decoder to access the STC counter. The decoder captures a second STC timestamp by writing across the bus to a first register in a bus interface on the receiver. Writing to the first register causes the second STC timestamp to be latched in a second register in the bus interface. The decoder may then complete capture of the second STC timestamp by retrieving it over the bus. The second STC timestamp may be compared to the last PCR timestamp received to provide an accurate indication of elapsed time since receipt of the last PCR timestamp.

Synchronization between the decoder and the receiver is maintained with a system timestamp captured by the decoder. This system timestamp is adjusted with a scaled offset based on a message delay time between the decoder and the receiver.

A further understanding of the nature and advantages of the present invention may be realized by reference to the remaining portions of the specification and the drawings.

DESCRIPTION OF THE SPECIFIC EMBODIMENTS

Figure 1:
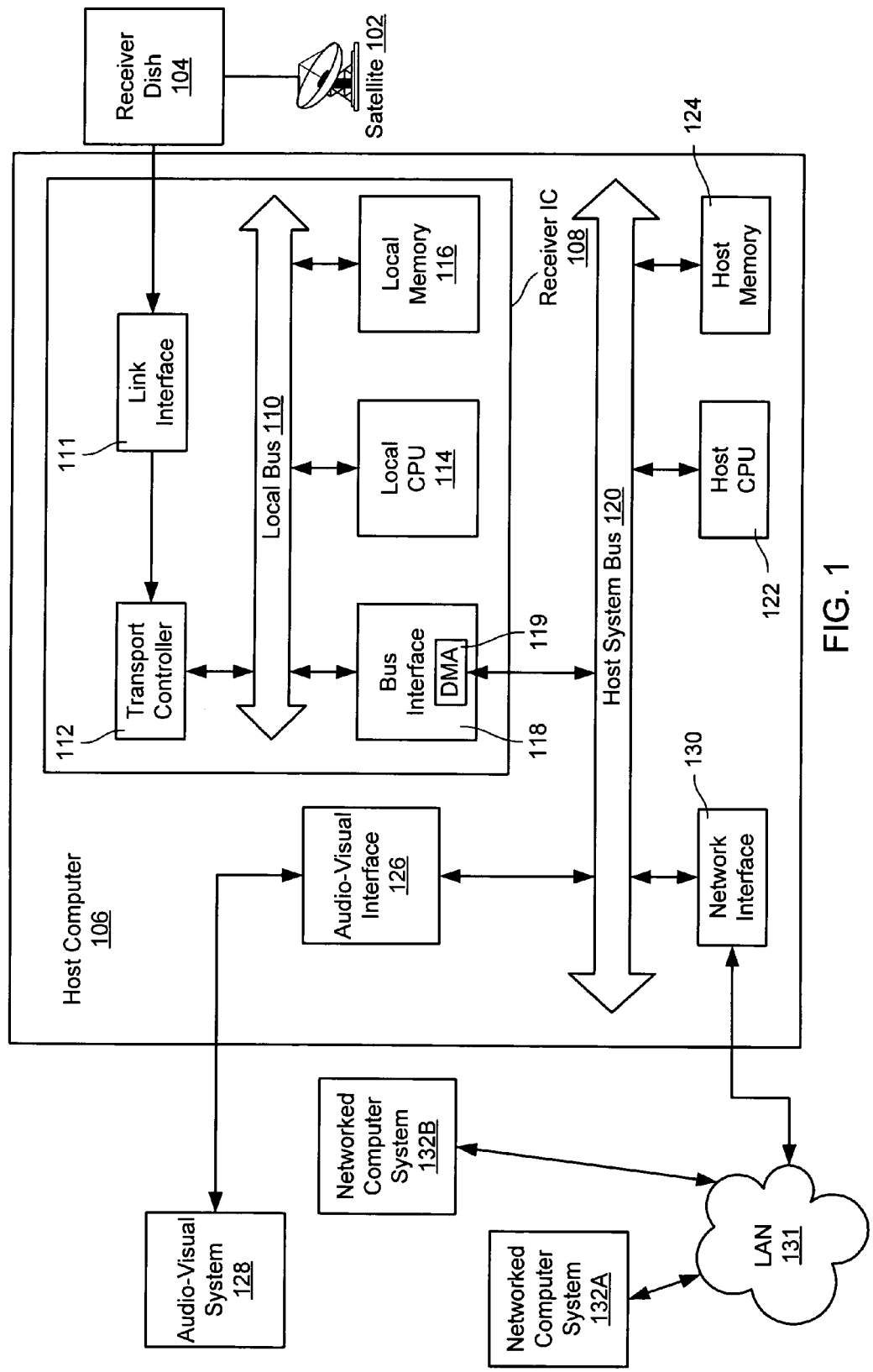
FIG. 1 is a schematic diagram including a system in accordance with a preferred embodiment of the present invention.

FIG. 1 is a schematic diagram including a system in accordance with a preferred embodiment of the present invention. A satellite transponder 102 transmits a signal carrying a transport stream to multiple receiver dishes 104, one of which is shown in FIG. 1. Receiver dish 104 in FIG. 1 is coupled to a host computer system 106 by way of a link interface 111 on a receiver circuit 108. Receiver circuit 108 may comprise an integrated circuit, a circuit board having the different receiver components attached thereto, or any other suitable circuit design or configuration.

Receiver circuit 108 includes a local bus 110 to which is coupled a transport controller 112, a local CPU 114, and local memory 116. Transport controller 112 receives the transport stream from link interface 111 and handles low-level transport stream parsing. Local CPU 114 comprises a microcontroller that controls operations on receiver circuit 108. Local memory 116 comprises memory such as static RAM, dynamic RAM, or ROM located on receiver circuit 108.

A bus interface 118 couples local bus 110 on receiver circuit 108 to a host system bus 120 of host computer 106. In a preferred embodiment, host system bus 120 comprises a PCI bus, and bus interface 118 comprises a PCI interface. Also coupled to host system bus 120 are a host CPU 122, host memory 124, an audio-visual interface 126, and a network interface 130, among other components. Host CPU 122 comprises the microprocessor of host computer 106, and host memory 124 comprises memory of host computer 106. Audio-visual interface 126 comprises a graphics interface that is coupled to an audio-visual system 128. Audio-visual system 128 may include, for example, speakers and a CRT monitor or a flat panel display. Network interface 130 comprises a network interface card which is coupled to a local area network (LAN) 131 which is in turn coupled to one or more networked computer system(s) 132. For example, network interface 130 may comprise an ethernet card, LAN 131 may comprise an ethernet network, and networked computer system(s) 132 may comprise personal computers.

The present invention relates to timing information based on a transmitter System Time Clock (STC) counter that is periodically inserted by the transmitter into a transport stream. There are various circumstances in which it is highly desirable to account for the delay between reception of a packet from the transmitter and actual applications using that packet. This is the case, for example, in applications where a direct memory access engine is used to transfer elementary streams from the receiver, such as described in the concurrently filed and commonly assigned U.S. patent application Ser. No. 09/651,539, entitled "MULTI-THREADED DIRECT MEMORY ACCESS ENGINE FOR BROADCAST DATA DEMULTIPLEX OPERATIONS," having Thomas Gene Adams and Gene Maine as coinventors, which is herein incorporated by reference for all purposes. Such applications may also include flexibile media access control as described in the concurrently filed and commonly assigned U.S. patent application Ser. No. 09/649,792, entitled "FLEXIBLE MEDIA ACCESS CONTROL AND SECTION FILTER HARDWARE ENGINE FOR SATELLITE DATA RECEIVER," having Thomas G. Adams and Randy R. Fuller as coinventors, which is also herein incorporated by reference for all purposes. Since there is considerable variability in the delay through the steps of demultiplexing the elementary streams and performing the direct memory access through the firmware and software layers, it is desirable to use the calculation of the delay to synchronize the operations.

Receiver circuit 108 receives the transport stream and utilizes the injected timing information for purposes of synchronizing a receiver System Time Clock (STC) counter with the transmitter STC counter. In accordance with a preferred embodiment, the timing information based on the transmitter STC clock is inserted into a special segment of a MPEG-2 transport packet that is called an "adaptation field." In particular, the adaptation field includes a Program Clock Reference (PCR) timestamp, which is a sampled value of the transmitter STC counter. When a packet containing a PCR value is initially received, it is timestamped with its local timer value. As the packets are passed to various drivers for processing, uncertainties in the hardware and software timing accumulate. It is therefore not possible simply to receive a PCR value from the received data stream, pass it between host drivers, and use it for decoder and presentation timing. According to embodiments of the invention, the PCR timestamp is instead referenced to a time base accessible to all host software elements. This system time value is referred to herein as "system time," with a latched value of system time being referred to as a "system timestamp." Various methods may be used to generate system time, including the use of performance timers or other computer timing references, provided that all host drivers have access to the same system time reference so that system timestamps may be compared.

Thus, in accordance with one embodiment of the present invention, at the start of every transport packet reception, a first latch in receiver circuit 108 captures a first STC timestamp. The first STC timestamp may be used to keep the receiver and the transmitter synchronized. In particular, if the transport packet contains a PCR timestamp from the transmitter, then the PCR timestamp is compared with the first STC timestamp. Based on the comparison, control adjustment may be made to the STC frequency in order to maintain synchronization. In a preferred embodiment, this synchronization is accomplished using firmware in a transport controller within receiver circuit 108.

Further in accordance with the present invention, the contents of the transport packet are to be utilized by a decoder that is on a separate node of a host system bus 120 from the receiver's node. The decoder may comprise hardware and/or software and may, for example, be part of an audio-visual interface 126. In an alternative embodiment, the decoder is part of a computer network interface 130. To overcome the fact that the decoder and receiver are on separate nodes of bus 120, a system and method is provided for the decoder to access the STC counter. The decoder captures a second STC timestamp by writing across bus 120 to a first register in a bus interface 118 on receiver circuit 108. Writing to the first register causes the second STC timestamp to be latched in a second register in bus interface 118. The decoder may then complete capture of the second STC timestamp by retrieving it over bus 120. The second STC timestamp may be compared to the last PCR timestamp received to provide an accurate indication of elapsed time since receipt of the last PCR timestamp.

The time between PCR reception and the decoder capturing the system timestamp may be quite variable. This delay time can be determined accurately by using the receiver and decoder timestamps. The system timestamp is then adjusted to account for this delay:

$$T_{system}' = T_{system} - x(T_{decoder} - T_{receiver}).$$

The adjusted system timestamp is calculated by offsetting the system timestamp by a scaled message delay. The message delay is the difference between the decoder timestamp $T_{decoder}$ and the receiver timestamp $T_{receiver}$. This message delay is scaled by the scale factor x to take into account that system time may be referenced to a different clock reference than the decoder and receiver timestamps. If they are referenced to the same clock reference, the scale factor may take the value x=1. However, in circumstances, for example, where system time is extracted from a personal computer clock and the decoder and receiver times are extracted from the receiver reference clock, the scale factor may be nonzero.

Having described several embodiments, it will be recognized by those of skill in the art that various modifications, alternative embodiments, and equivalents may be used without departing from the spirit of the invention. Accordingly, the above description should not be taken as limiting the scope of the invention, which is defined in the following claims.

What is claimed is:

1. A method for synchronizing a system including a host computer having a microprocessor, a receiver circuit and a decoder circuit, the method comprising:

(a) coupling the receiver circuit with the decoder circuit and the microprocessor, wherein the receiver circuit, decoder circuit, and microprocessor each comprise separate nodes of a bus in the host computer;

(b) maintaining synchronization between the receiver circuit and a transmitter external to the host computer by receiving a first transport packet from the transmitter with the receiver circuit; capturing a first system time clock (STC) timestamp at a start of receiving the first transport packet, the first STC timestamp being captured into a latch in the receiver circuit; obtaining a program clock reference (PCR) timestamp from the transport packet; comparing the first STC timestamp to the PCR timestamp to generate a comparison result; and adjusting a STC frequency based on the comparison result by using firmware within the receiver circuit;

(c) capturing, with the decoder circuit, a second STC timestamp; and (d) adjusting a system timestamp with an offset based on a message delay time between the second STC timestamp and a last PCR timestamp received maintain synchronization between the decoder circuit and the receiver circuit.

2. The method according to claim 1 wherein the decoder circuit comprises an audio-visual interface.

3. The method according to claim 1 wherein the decoder circuit comprises a computer network interface.

4. The method according to claim 1 wherein the offset is scaled by a nonunity value.

5. A system for synchronizing a system including a host computer having a microprocessor, a receiver circuit and a decoder circuit, the system comprising:

(a) a bus in the host computer having the microprocessor, the receiver circuit and the decoder circuit on separate nodes thereof;

(b) the receiver circuit being adapted to maintain the synchronization between the receiver circuit and a transmitter external to the host computer, the receiver circuit comprising: a parser adapted to obtain a program clock reference (PCR) timestamp from a first transport packet, the first transport packet including the PCR timestamp; a first latch coupled to the parser, the first latch being adapted to capture a first system time clock (STC) timestamp near a beginning of receipt of a first transport packet from a transmitter by the receiver circuit; a comparison device coupled to the parser and to the latch, the comparison device being configured to compare the first STC timestamp to the PCR timestamp so as to generate a comparison result; and a first adjuster coupled to the comparison device, the first adjuster being adapted to adjust a frequency of the system time clock based on the comparison result by using firmware within the receiver circuit;

(c) the decoder circuit configured to capture a second STC timestamp; and (d) wherein the system adjusts a system timestamp with an offset based on a message delay time between the second STC timestamp and a last PCR timestamp received.

6. The system according to claim 5 wherein the decoder circuit comprises an audio-visual interface.

7. The system according to claim 5 wherein the decoder circuit comprises a computer network interface.

8. The system according to claim 5 wherein the offset is scaled by a nonunity value.

9. A method for synchronizing a system including a host computer having a microprocessor, a receiver circuit and a decoder circuit, the method comprising:

(a) coupling the receiver circuit with the decoder circuit and the microprocessor, where the receiver circuit decoder circuit, and microprocessor each comprise separate nodes of a bus in the host computer;

(b) maintaining synchronization between the receiver circuit and a transmitter external to the host computer by receiving a first transport packet from the transmitter with the receiver circuit; capturing a first system time clock (STC) timestamp at a start of receiving the first transport packet, the first STC timestamp being captured into a latch in the receiver circuit; obtaining a program clock reference (PCR) timestamp from the transport packet; comparing the first STC timestamp to the PCR timestamp to generate a comparison result; and adjusting a STC frequency based on the comparison result by using firmware within the receiver circuit;

(c) writing into a first register in a bus interface;

(d) latching a second STC timestamp into a second register in the bus interface wherein the writing into the first register causes the second STC timestamp to be latched into the second register; and (e) retrieving the second STC timestamp to the decoder circuit by way of the second register.

10. The method according to claim 9 wherein the decoder circuit comprises an audio-visual interface.

11. The method according to claim 9 wherein the decoder circuit comprises a computer network interface.

12. A system for synchronizing a system including a host computer having a microprocessor, a receiver circuit and a decoder circuit, the system comprising:

(a) a bus in the host computer that couples the receiver circuit with the decoder circuit and the microprocessor, wherein the receiver circuit, the decoder circuit, and the microprocessor each comprise separate nodes of the bus;

(b) the receiver circuit being adapted to maintain the synchronization between the receiver circuit and a transmitter and external to the host computer, the receiver circuit comprising: a parser adapted to obtain a program clock reference (PCR) timestamp from a first transport packet, the first transport packet including the PCR timestamp; a first latch coupled to the parser, the first latch being adapted to capture a first system time clock (STC) timestamp near a beginning of receipt of a first transport packet from a transmitter by the receiver circuit; a comparison device coupled to the parser and to the latch, the comparison device being configured to compare the first STC timestamp to the PCR timestamp so as to generate a comparison result; and a first adjuster coupled to the comparison device, the first adjuster being adapted to adjust a frequency of the system time clock based on the comparison result by using firmware within the receiver circuit;

(c) a first register in a bus interface; and (d) a second register in the bus interface, the second register being adapted to latch a second STC timestamp, wherein writing into the first register causes the second STC timestamp to latched into the second register wherein the second STC timestamp is provided to the decoder circuit by way of the second register.

13. The system according to claim 12 wherein the decoder circuit comprises an audio-visual interface.

14. The system according to claim 12 wherein the decoder circuit comprises a computer network interface.

* * * * *